(12) United States Patent
Tomita

(10) Patent No.: US 7,330,212 B2
(45) Date of Patent: Feb. 12, 2008

(54) DRIVE CONTROLLER OF LENS APPARATUS

(75) Inventor: Yasuyuki Tomita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 11/143,249

(22) Filed: Jun. 2, 2005

(65) Prior Publication Data

US 2005/0271373 A1    Dec. 8, 2005

(30) Foreign Application Priority Data

Jun. 4, 2004    (JP) .............................. 2004-167595

(51) Int. Cl.
   *G03B 13/00*    (2006.01)
(52) U.S. Cl. .......................... 348/345; 359/698; 396/80
(58) Field of Classification Search ................ 396/103, 396/73, 74, 75, 79, 80, 81, 82, 83, 89; 359/698, 359/684; 348/208.12, 345, 351, 335
   See application file for complete search history.

(56) References Cited

U.S. PATENT DOCUMENTS

| | | | |
|---|---|---|---|
| 6,924,941 B2* | 8/2005 | Okada et al. ............... | 359/698 |
| 6,989,865 B1* | 1/2006 | Ohta ........................... | 348/347 |
| 2003/0137748 A1* | 7/2003 | Mukaiya ..................... | 359/698 |
| 2004/0051966 A1* | 3/2004 | Nurishi ....................... | 359/698 |
| 2004/0061949 A1* | 4/2004 | Yakita et al. ............... | 359/697 |
| 2004/0189858 A1* | 9/2004 | Wakazono ................. | 348/347 |
| 2005/0001924 A1* | 1/2005 | Honda ........................ | 348/348 |

FOREIGN PATENT DOCUMENTS

| | | | |
|---|---|---|---|
| EP | 0439219 | | 7/1991 |
| EP | 1345060 | | 9/2003 |
| EP | 1553434 | | 7/2005 |
| JP | 08-036129 | * | 2/1996 |
| JP | 8-36129 A | | 2/1996 |
| JP | 2003-222788 | | 8/2003 |

OTHER PUBLICATIONS

An English translation of JP08-036129.*

* cited by examiner

*Primary Examiner*—Kenneth Parker
*Assistant Examiner*—Jay C. Kim
(74) *Attorney, Agent, or Firm*—Canon U.S.A. Inc I.P. Div

(57) ABSTRACT

A drive controller of a lens apparatus including a first lens unit movable to perform manual focus and a second lens unit disposed closer to an image than the first lens unit. The drive controller includes a detection device detecting a focal state of the lens apparatus, a storage device storing the detected focal state, and a control device controlling focus by driving the second lens unit to a focal position based on the detected focal state. The control device performs a compensation operation on the manual focus with the focus control after completion of the manual focus. The drive controller eliminates a clutch mechanism for selecting drive systems for the manual focus and focus adjustment and performs a focus adjustment (a compensation operation) after completion of the manual focus while minimizing a space needed for a rear focus unit to move.

8 Claims, 7 Drawing Sheets

DRIVE CONTROLLER OF LENS APPARATUS

BACKGROUND OF THE INVENTION

1. Field of the Invention

The present invention relates to a drive controller of a lens apparatus used, for example, for picking up a picture for television, in particular, of a lens apparatus capable of performing manual focus.

2. Related Background Art

An optical system of a business-use lens apparatus (hereinafter, referred to as a TV lens), for example, used for picking up a picture for television, generally in the order from an object to an image, includes a front lens unit for performing focus adjustment, a power-varying lens unit including a variator for performing power-varying and a compensator for compensating movement of an image plane due to the power-varying, and an image-forming lens unit for forming an image. Upon bringing an object into focus, manual focus is performed for driving the front lens unit by mechanically transmitting a manual operation or electrically driving it in response to the manual operation.

This is because a professional camera operator operating a TV lens not only merely focuses the lens on a subject but also often intentionally defocuses it with an intention of achieving an imaging effect, whereby the operator wants to have a choice of manual focus.

As such, many lenses having a higher resolving power and a smaller depth of field than ever before thanks to prevalence of a high definition (HD) camera are used.

When a TV lens having a small depth of field is used, a picture-pickup operator has difficulty of determining whether focusing adjustment is achieved with the help of an image appearing in a small viewfinder provided in the camera. Accordingly, even when the pickup operator believes that the focusing is achieved by manual focus, the operator may find slight focal shift upon checking a recorded image.

In order to solve such a problem, a TV lens having an auto-focus function similar to a consumer-oriented one, in addition to having a manual focus function, so as to adjust a focal position of the manual focus with a variety of functions is recently proposed.

For example, Japanese Patent No. 3412713 proposes a focusing method in which focusing adjustment is performed such that a focal-point evaluation value obtained from a picture signal during manual focus is stored, and, after completion of the manual focus, the lens unit moved by the manual focus is driven to a position at which the stored focal-point evaluation value is maximum (see Columns 0012 to 0015, FIG. 1, and so forth).

Unfortunately, with the method disclosed in the above patent document, since the lens unit driven to a position at which the focal-point evaluation value is maximum is identical to that driven during the manual focus, a clutch mechanism for selecting one of drive systems for the manual focus and for afterward focus adjustment is needed, thereby leading to a complicated structure of the lens apparatus.

A drive mechanism different from that including the clutch mechanism, having a structure in which a focus operation member is endlessly rotatable, for example, a drive mechanism of an electronic ring type, generally used in a consumer-oriented video camera and having a structure in which an operation quantity of the focus operation member is detected by an encoder or the like, and a focus lens is driven by a drive member such as a motor in accordance with a detected quantity can make the structure of the lens apparatus simple.

Unfortunately, since a professional camera operator often picks up a picture while making guesswork of a focal position from an extremely close end to an infinite end, relative to the operation end of the operating member, endless rotation of the operating member causes a problem that picking up a picture is difficult.

In a consumer-oriented video camera, as an auto-focus system, a rear focus system in which a lens unit closer to an image than a power-varying lens unit is generally used. Whereas, in a TV lens different from the consumer-oriented one, since its variable power ratio and the image size of an image pickup element are great, a large space is needed for achieving the entire focus by using only a rear focus lens unit. In the meantime, the TV lens has a structure in which an extender or the like can be inserted so as to shift a focal position of the overall lens system, whereby keeping a space allowing the rear focus lens to move is difficult.

SUMMARY OF THE INVENTION

The present invention is directed to a drive controller of a lens apparatus, with which a clutch mechanism for selecting one of drive systems for manual focus and for focus adjustment is eliminated, which has excellent operability, and which also performs focus adjustment after completion of the manual focus (a compensation operation) while minimizing a space needed for a rear focus lens to move.

According to one aspect of the present invention, a drive controller of a lens apparatus including a first lens unit movable to perform manual focus and a second lens unit disposed closer to an image than the first lens unit includes a detection device detecting a focal state of the lens apparatus, a storage device storing the focal state detected by the detection device, and a control device controlling focus by driving the second lens unit to a focal position based on the focal state detected by the detection device and stored in the storage device during performing manual focus. The control device also performs a compensation operation on the manual focus with the focus control of the control device after completion of the manual focus.

Further features and advantages of the present invention will become apparent from the following description of exemplary embodiments with reference to the attached drawings.

DESCRIPTION OF THE EMBODIMENTS

First Embodiment

Figure 1:
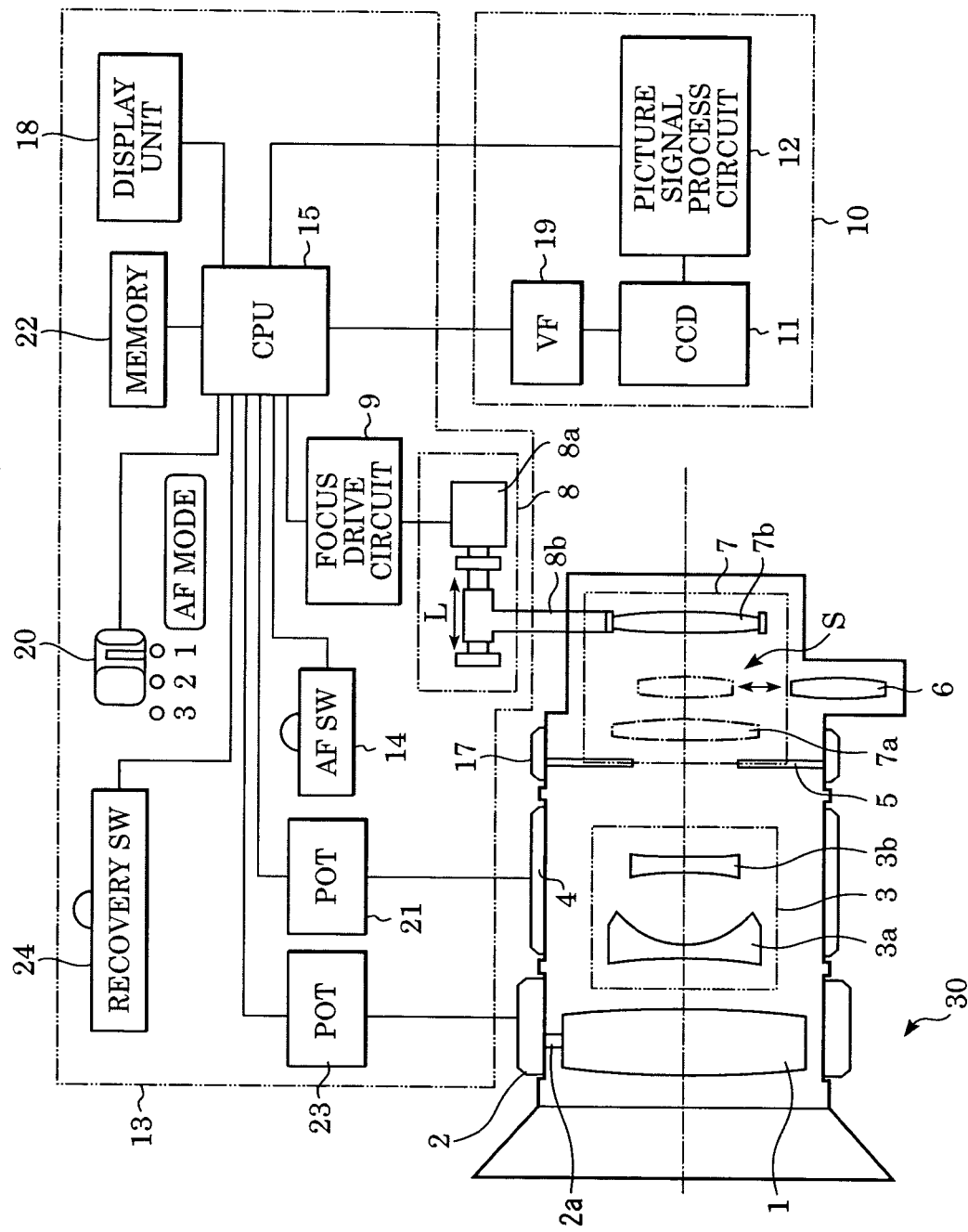
FIG. 1 is a block diagram illustrating the structure of a pickup system according to a first embodiment of the present invention.

FIG. 1 shows the structure of a pickup system according to a first embodiment of the present invention. The pickup system includes a zoom lens apparatus 30, a drive unit (a drive controller) 13 incorporated with the lens apparatus 30, and a pickup apparatus 10 such as a TV camera or a video camera incorporated with the lens apparatus 30.

The zoom lens apparatus 30 has a pickup optical system disposed therein, including a front focus lens unit (a first lens unit) 1, a zoom lens unit 3, an aperture 5, and a relay lens unit 7 in the order from an object (from the left of the figure) to an image.

The front focus lens unit 1 moves for performing manual focus. The lens apparatus 30 has a manual focus ring 2 rotatably fixed at the periphery thereof within a predetermined angle range. Rotation of the manual focus ring 2 is transmitted to the front focus lens unit 1 through a transmission mechanism 2a such as a cam so as to serve as a drive force in the optical axis direction.

Since the manual focus ring 2 has the rotational operation end rotating so as to correspond to the predetermined angle range, a picture pickup operator knows using his senses whether the first focus lens unit 1 lies on the infinite side or the extremely close side, relative to the operation end.

The zoom lens unit 3 includes a variator lens subunit 3a shifting a focal position of the pickup optical system, that is performing power-varying, and a compensator lens subunit 3b compensating fluctuation of an image plane caused by the power-varying, and moves in the optical direction in response to the rotational operation of a zoom operation ring 4 rotatably fixed at the periphery of the lens apparatus 30.

The aperture 5 adjusts a quantity of light by varying the diameter in response to a rotational operation of an aperture operation ring 17 rotatably fixed at the periphery of the lens apparatus 30.

The relay lens unit 7 has a function of forming an image and includes a rear focus lens unit (a second lens unit) 7b driven along the optical axis with an auto-focus (AF) control, which will be described later. The relay lens unit 7 has a space S defined therein closer to an object than the rear focus lens unit 7b. An extender lens unit 6 can be inserted into or taken out from the space S, for shifting a focal position of the pickup optical system toward the telephoto side.

The rear focus lens unit 7b is driven in the optical axis direction by a drive unit 8 including a stepping motor 8a and a rack 8b engaging with a feed screw serving as an output shaft of the motor 8a. The drive unit 8 is controlled by a focus drive circuit 9.

Although the rear focus lens unit 7b is illustrated as a single lens unit in the figure, it may be composed of a plurality of lens units, and a part of them may be driven for performing an auto focus operation.

In the camera 10, a subject image passing through the pickup optical system is formed on an image pickup element 11 including a CCD sensor or a CMOS sensor and is subjected to photoelectric conversion. An output signal of the image pickup element 11 is converted to a video signal (a picture signal) with a video signal process circuit 12. Also, a picture signal corresponding to the video signal is displayed on an electronic viewfinder 19.

The drive unit 13 has a CPU (as a control device and a detection device) 15 serving as a controller for controlling a variety of operations thereof, the drive unit 8, and the focus drive circuit 9, all disposed therein.

Also, the drive unit 13 has drive units (not shown) disposed therein, for driving the corresponding manual focus ring 2, zoom operation ring 4, and aperture operation ring 17, all disposed in the lens apparatus 30, and, through clutch mechanisms disposed in the drive units, the front focus lens unit 1, the zoom lens unit 3, and the aperture 5 are electrically driven by the drive units. These drive units are controlled by the CPU 15 which receives signals from operation switches (not shown) including a focus operation switch, a zoom operation switch, and an aperture operation switch.

Meanwhile, an operation in which the front focus lens unit 1 is driven by the drive unit 13 in response to an operation of the focus operation switch is also called manual focus in the same fashion as in the operation in which the front focus lens unit 1 is directly driven in accordance with an operation of the manual focus ring 2.

The drive unit 13 also has position detectors 23 and 21 disposed therein, such as potentiometers or encoders, outputting signals corresponding to rotational positions of the manual focus ring 2 and the zoom operation ring 4, that is, corresponding to positions or movements of the front focus lens 1 and the zoom lens unit 3.

The drive unit 13 further has a focus compensation switch (AF SW) 14 disposed therein, which is operated by a picture pickup operator when using a focus compensation function.

In the present embodiment, a focus compensation function (or a focus compensation operation) means a function (or an operation) in which, in order to achieve a more accurate focus state after completion of the manual focus, the rear focus lens unit 7b is driven to a substantial focus position (a focus position or in the vicinity of the focus position) of the pickup optical system by using a picture signal representing a focal state of the same. Also, a mode of performing the focus compensation function with the CPU 15 is called a focus compensation mode, and a mode of holding the rear focus lens unit 7b in an unmovable state during the operation of the manual focus is called a manual focus mode.

Further, the drive unit 13 has an AF mode selection switch 20 and a focus recovery switch (a recovery SW) 24 disposed therein, which will be described later, each operated by a picture pickup operator, in addition to having a memory 22 and a display unit 18 such as a liquid crystal display or a light-emitting diode (LED) display, disposed therein.

During the manual focus performed by moving the front focus lens unit 1, the CPU 15 detects the position of the zoom lens unit 3 and the state of a picture signal taken in from the video signal process circuit 12 of the camera 10 (actually, an AF evaluation value, which will be described later) and stores them in the memory 22. The state of the picture signal can be detected by monitoring the peak values of high-frequency components extracted from the picture signal, that is, the level of the AF evaluation value. The lens position at which the maximum of the AF evaluation value is provided serves as a focal position.

When the picture-pickup operator hopes to use the focus compensation function after completion of the manual focus, the operator turns the focus compensation switch 14 on. Although the position of the focus compensation switch 14 on the drive unit 13 is not particularly limited, with respect to a handheld pickup system as in the present embodiment, the picture-pickup operator generally gets a grip section of the drive unit 13 with his or her right hand and manually operates the lens apparatus 30 with his or her left hand, whereby the focus compensation switch 14 is disposed on the left side surface of the pickup system when viewed from the camera 10. Also, when electric drive is used in the lens apparatus 30, the focus compensation switch 14 is disposed above the focus operation switch. Otherwise, it may be disposed on the upper surface of the drive unit 13 or the like as long as it is easy to handle.

The focus compensation switch 14 is not limited to being operated after completion of the manual focus. For example, when having decided to use the focus compensation function prior to the manual focus, the picture-pickup operator may set such that the focus compensation operation is automatically performed upon completion of the manual focus, for example, by pushing the focus compensation switch 14 for a long period time (or by operating another switch) prior to the manual focus. Completion of the manual focus is found by detecting the fact that a picture signal having varied in accordance with the manual focus varies no more. In this case, the pickup system recovers automatically to the manual focus mode after completion of the focus compensation operation.

Alternatively, the pickup system may also perform the manual focus while operating the focus compensation switch 14 so as to be turned on and move to a focus compensation mode upon detecting turn-off of the focus compensation switch 14 (completion of the manual focus).

In the following description, the pickup system moves to the focus compensation mode in response to an operation of the focus compensation switch 14 after completion of the manual focus.

When the focus compensation switch 14 is turned on in the manual focus mode, the CPU 15 is involved in the focus compensation mode upon detecting an ON-signal from the focus compensation switch 14, refers to a change in the AF evaluation value stored in the memory 22 during the previous manual focus, and issues a drive command to the focus drive circuit 9 so as to drive the rear focus lens unit 7*b* in a direction in which the AF evaluation value is increased, in other words, the rear focus lens unit 7*b* comes closer to the focus position. A drive direction of the rear focus lens unit 7*b* is determined on the basis of information of change in the AF evaluation value and positional information of the front focus lens unit 1 obtained by the position detector 23, and a drive quantity of the rear focus lens unit 7*b* is computed on the basis of a move quantity of the front focus lens unit 1 (a focus operation quantity) during the manual focus, and positional information (zoom positional information) of the zoom lens unit 3, and other positional information (aperture positional information) of the aperture 5, both obtained from the position detector 21. With this arrangement, the rear focus lens unit 7*b* is driven by the drive unit 8 so as to reach the substantial focus position.

Having a lighter weight than the front focus lens unit 1, the rear focus lens unit 7*b* can be highly-responsively driven at high speed, which is indispensable for the focus compensation operation, and also driven while consuming less power by using a small motor as the motor 8*a* of the drive unit 8.

In the focus compensation mode, the CPU 15 also takes in a video signal from the video signal process circuit 12 of the camera 10 and generates an AF evaluation value for each video frame. With this arrangement, it can be determined whether the rear focus lens unit 7*b* moves properly toward a focusing direction until it reaches the substantial focus position. With the foregoing focus compensation operation, a focal state disagreeing with a focus state in a narrow sense can be accurately shifted to the focus state.

Figure 2:
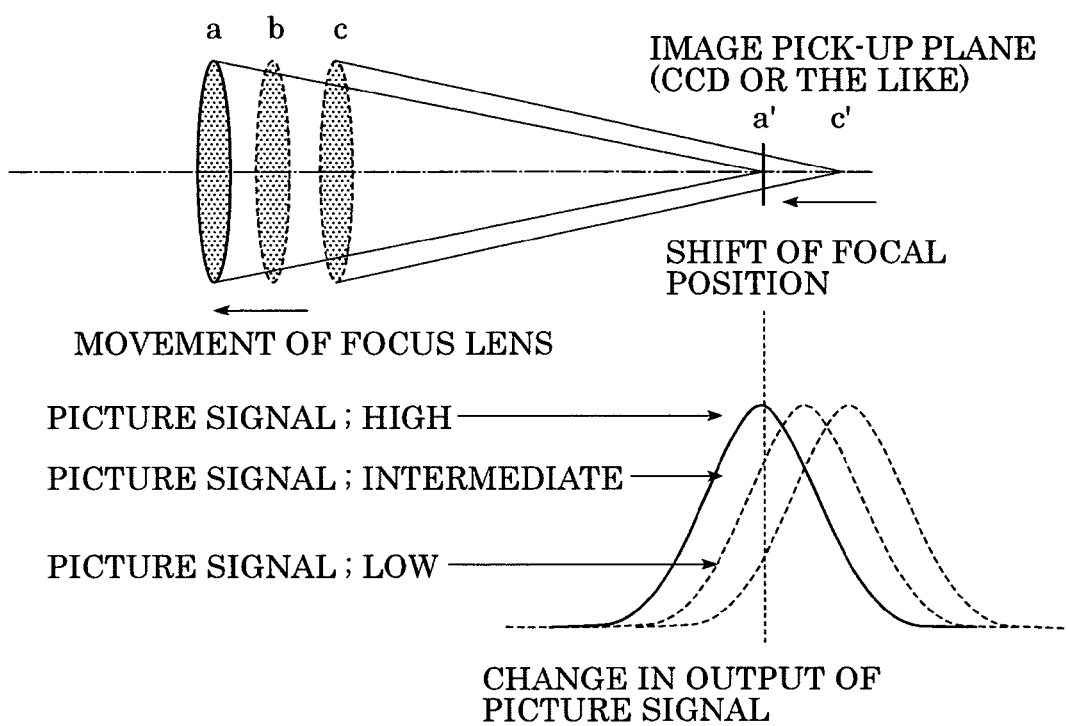
FIG. 2 illustrates the relationship between the position of a focus lens and shift of a focal position and a change in each AF evaluation-value signal.

FIG. 2 is a conceptual diagram, illustrating the relationship between shift of the focal position in accordance with movement of the focus lens (the front focus lens unit 1 or the rear focus lens unit 7*b*) and changes in respective picture signals (respective AF evaluation values) in response to the movement. Movement of the focus lens causes a focal position to shift, thereby changing the level of a picture signal generated from an output signal of the image pickup element 11.

In the figure, when the focus lens lies at position "a", the focal position is represented by "a'" in agreement with an image pickup plane of the image pickup element 11, and the level of the picture signal is maximum. When the focus lens lies at position "c", the focal position is represented by "c'" in disagreement with the image pickup plane of the image pickup element 11, and the level of the picture signal is low. Also, when the focus lens lies at position "b" lying between the positions "a" and "c", the focal position is represented by a position lying between the image pickup planes "a'" and "c'" of the image pickup element 11, and the level of the picture signal is lower than the maximum of the picture signal and higher than that in the case where the focal position of the focus lens is represented by "c'".

Figure 3:
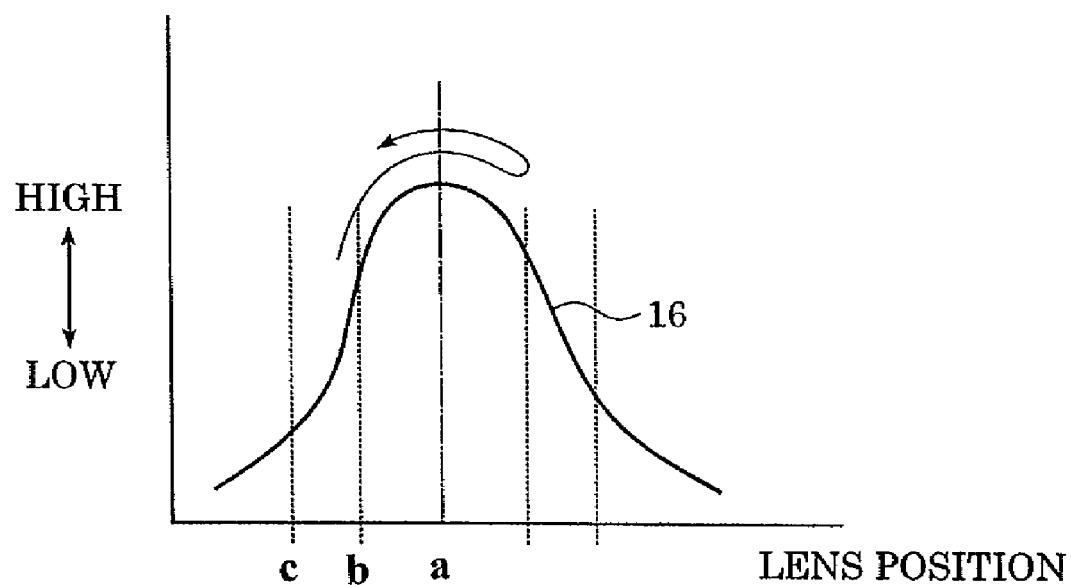
FIG. 3 illustrates AF evaluation-value signal.

FIG. 3 is a graph of the relationship shown in FIG. 2, illustrating a focus lens position along the horizontal axis and a picture signal (an AF evaluation value) along the vertical axis.

When the focus lens lies at the position "c", the AF evaluation value lies in a low state. When the focus lens lies at the position "b", the AF evaluation value lies in a higher state. When the focus lens moves to the position "a" after elapse of an additional time, the maximum of the AF evaluation value is detected. According to the manual focus, as shown by the arrow indicated in the figure, focus adjustment is often performed by moving the front focus lens 1 so as to pass over the focal position temporarily and by moving the same in the reverse direction. In this case, as the front focus lens 1 moves away from the focus position, the AF evaluation value becomes gradually smaller. In other words, the AF evaluation value varies in a manner of drawing a parabola 16 having a single peak as focus lens 1 position changes.

Accordingly, by storing such a change in the AF evaluation value in the memory 22 during the manual focus, the position of the front focus lens 1 at which the maximum of the AF evaluation value is provided can be determined. Thus, in the focus compensation mode, by computing a drive direction and a drive quantity of the rear focus lens unit 7*b* needed for maximizing a reduced AF evaluation value on the basis of the position of the front focus lens 1 at which the maximum of the AF evaluation value is provided, the position of the zoom lens unit 3, and so forth, and by driving the rear focus lens unit 7*b* on the basis of the computed result, an accurate focus state can be obtained.

An operation of the CPU 15 according to the present embodiment, performed from the manual focus to achieving the focal state through the focus compensation operation, will be described with reference to a flowchart shown in FIG. 4.

In Step (simply denoted by S in the figure) 101, the CPU 15 is operated in the manual focus mode and stores a change in the AF evaluation value in the memory 22. Upon receipt of an ON-signal of the focus compensation switch 14 (that is, upon completion of the manual focus), the CPU 15 moves to the focus compensation mode.

In Step 102, on the basis of information of change in the AF evaluation value and positional information of the front focus lens unit 1 stored in the memory 22, the CPU 15 determines a drive direction in which the maximum of the AF evaluation value is obtained, and also, on the basis of focus operation quantity information and the zoom positional information during the manual focus, computes a target drive quantity of the rear focus lens unit 7b, with which the maximum of the AF evaluation value is obtained.

In Step 103, it is determined whether the rear focus lens unit 7b can be driven with the target drive quantity in the drive direction determined in Step 102. That is, whether the target drive quantity lies within a movable range of the rear focus lens unit 7b, which will be described later. In other words, it is determined whether a present AF evaluation value can be increased so as to agree substantially with the maximum of the AF evaluation value stored in the memory 22 by driving the rear focus lens unit 7b.

When lying within the movable range, the process moves to Step 104, and the rear focus lens unit 7b starts to be driven with the target drive quantity in the determined drive direction. Then, the process moves to Step 105.

When lying out of the movable range, the process moves to Step 110, in which focus compensation drive of the rear focus lens unit 7b is suspended. Then, the process ends.

In Step 105, a change in the AF evaluation value is detected during driving the rear focus lens unit 7b, and in the following Step 106, it is determined whether the rear focus lens unit 7b is driven in the proper direction so as to increase the AF evaluation value. When driven in the proper direction, the rear focus 7b is continuously driven in the same direction.

In Step 108, it is determined whether the AF evaluation value agrees substantially with the maximum of the AF evaluation value stored in the memory 22 (whether the AF evaluation value lies within a predetermined error range). When the AF evaluation value agrees substantially with the maximum, the process moves to Step 109, and driving of the rear focus lens unit 7b is stopped. When the AF evaluation value agrees substantially with the maximum of the AF evaluation value stored in the memory 22 before the rear focus lens unit 7b is driven with the target drive quantity determined in Step 102, driving of the rear focus lens unit 7b is stopped.

Even when the AF evaluation value does not agree with the maximum, even after driving the rear focus lens unit 7b with the target drive quantity, the process moves to Step 111, and the rear focus lens unit 7b is driven to the position at which the maximum of the AF evaluation value is provided (an error-occurrence drive process is performed, which will be discussed later) on the basis of a change in the picture signal in accordance with the movement of the rear focus lens unit 7b. In this case, the rear focus lens unit 7b may be finely driven by wobbling so as to search for the position at which the AF evaluation value is the closest to the maximum.

When a reduced AF evaluation value is found in Step 106, determining that the determined drive direction of the rear focus lens unit 7b is wrong, the drive direction is reversed, the process moves to Step 111, and the foregoing error-occurrence drive process is performed.

As described above, the rear focus lens unit 7b is driven in the proper direction within a movable range, which will be described later, whereby the CPU 15 can drive the rear focus lens unit 7b to the focus position at which the maximum of the AF evaluation value is provided.

The pickup optical system according to the present embodiment has a structure in which the zoom lens unit 3 is sandwiched by the two focus lens units 1 and 7b. Also, according to the present embodiment, the rear focus lens unit 7b is driven in response to the operation of the focus compensation switch 14 regardless of the position of the front focus lens unit 1. In the meantime, the focus compensation operation causes the pickup apparatus 10 to be subjected to a back focus shifted from its normal value, whereby focus adjustment is not achieved when a zooming operation is performed after completion of the focus compensation operation.

Figure 5:
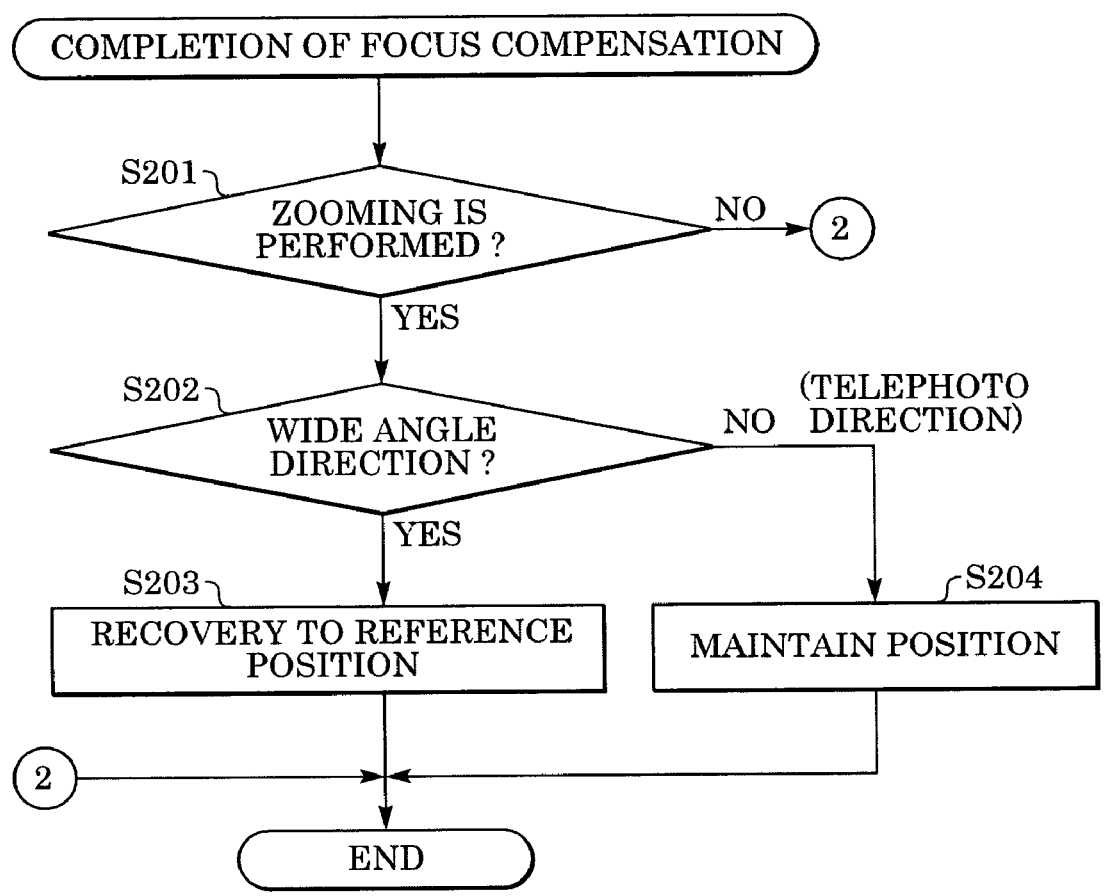
FIG. 5 is a flowchart of a recovery operation to the reference position of the pickup system according to the first embodiment.

In view of the above problem, according to the present embodiment, as illustrated in a flowchart shown in FIG. 5, upon completion of the focus compensation operation, the CPU 15 checks, via the position detector 21, whether the zooming operation is performed (in Step 201). If YES, the CPU 15 determines whether the zooming operation is performed in a wide-angle direction or a telephoto direction (in Step 202). When performed in the wide-angle direction, the CPU 15 controls the rear focus lens unit 7b so as to be quickly returned to its reference position, that is, the position at which normal back focus is achieved without a focal shift even when the focus adjustment and the zooming operation are performed by the front focus lens unit 1, (in Step 203). When performed in the telephoto direction, the CPU 15 controls the rear focus lens unit 7b so as to continuously lie at the position at which it lies upon completion of the focus compensation (in Step 204).

In the lens apparatus according to the present embodiment, a power-varying member such as the extender lens unit 6 for shifting the focal position of the pickup optical system toward the telephoto or wide-angle side is provided in the space S in the relay lens unit 7 as described above. Meanwhile, an auto-focus operation of a pickup system of a rear focus type, which is popular in a consumer-oriented video camera or the like, causes the focus lens unit to move on the close range side and requires keeping both a wide space for performing the auto-focus operation and a space for the power-varying member to be inserted, thereby leading to a longer lens apparatus. Hence, such type is inappropriate as a handheld TV lens.

With the above problem in mind, according to the present embodiment, by limiting the movable range of the rear focus lens unit 7b (that is, the drive range of the same by the drive unit 13), the pickup apparatus 10 is prevented from having a longer size. Hence, when the movable range of the drive unit 8 (the rack 8b) of the drive unit 13 is limited to a small value L, and when a drive quantity lying out of the movable range L is detected upon the focus compensation operation, the rear focus lens unit 7b is not driven to the edge of the movable range or driving of the rear focus lens unit 7b is stopped (see Step 110 shown in FIG. 4).

According to the present embodiment, when a focal depth of the lens apparatus (the pickup optical system) is defined by D, the movable range L of the rear focus lens unit 7b is set, from its reference position in the direction toward each of an object and an image, so as to satisfy the following expressions:

$$D = Fno \times \delta,$$

and $$0 < L < 10D,$$

where Fno represents an F-number of the lens apparatus (the pickup optical system), and δ represents the diameter of a permissible circle of confusion. The movable range L is narrowest on the aperture side and is required to be wider as the F-number of the lens apparatus is greater.

According to the present embodiment, since a scene where the focus compensation operation is needed by a picture-pickup operator is present in the vicinity of an aperture F-number of the pickup system at which the pickup system has a small focal depth, limitation of the movable range L is determined in accordance with the aperture F-number. With respect to the zoom lens apparatus, its F-number on the telephoto side is sometimes limited (subjected to F-drop) in accordance with the effective diameter of the front focus lens unit in order to prevent an increase in the lens weight. In such a case, the movable range L is determined in accordance with the aperture F-number at the telephoto end.

In a handheld zoom lens (an electronic news gathering (ENG) zoom lens) apparatus used for collecting news data or the like, the aperture F-number at the wide-angle end is generally about F/1.4 to 2, while the aperture F-number at the telephoto end is about F/2 to 3. In a higher-magnification zoom lens (an electronic field production (EFP) zoom lens) having a magnification not less than 40 and used for broadcasting a sports program or the like, the aperture F-number at the wide-angle end is equivalent to that of the ENG zoom lens, while the aperture F-number at the telephoto end is about F/2.8 to F/5.6.

In the meantime, although the diameter of a permissible circle of confusion is determined in accordance with, for example, the pixel size of the pickup element mounted in the camera, in cameras respectively having a ⅔-inch pickup element (with an image diagonal length of 11 mm) mounted therein and a ½-inch pickup element (with an image diagonal length of 6 mm) mounted therein, both used in a conventional TV (a standard definition TV (SDTV)) system such as a National Television System Committee (NTSC) TV system or a Phase Alternating Line (PAL) TV system, the diameter is about 0.02 mm, the committee diameters of permissible circles of confusion are respectively about 0.02 mm and 0.016 mm. Also, in a camera having a ⅔-inch pickup element for use in a high definition TV (HDTV) mounted therein, the diameter of a permissible circle of confusion is about 0.01 mm. Since the diameter of a permissible circle of confusion of the pickup system varies depending on the TV system, the image size of the pickup element, the number of overall pixels, as described above, it must be determined so as to meet the purpose of the pickup system.

For example, in a ⅔-inch SDTV pickup system, and when the aperture F-number at the telephoto end is set at F/4, the movable range L is given as below:

$$0 < L < 0.8 \text{ mm}.$$

In a ⅔-inch HDTV pickup system, the movable range L is given as below:

$$0 < L < 0.4 \text{ mm}.$$

Further, a broadcasting zoom lens is compatibly fixed to either the SDTV and HDTV pickup systems as long as it is used for a ⅔-inch camera. Also, a so-called multi-format camera supporting the SDTV or HDTV systems depending on a broadcasting system is commercialized. Accordingly, it is desirable that the movable range L can be changed depending on the purpose of the pickup system, and, in this case, can be changed with electrical control without changing the mechanical movable range in order to simplify the structure of the pickup system.

Although the movable range L has a limited maximum in order to compensate for a slight focal shift, it can be also set as below so as to continuously maintain the focus state even when a subject makes a large movement in a back and forth direction, or it should be appropriately set, taking account of the weight, the size and so forth of the pickup system:

$$0 < L < 50D,$$

or $$0 < L < 100D.$$

According to the present embodiment, the rear focus lens unit 7b is driven by the pulse motor 8a as shown in FIG. 1, and, with the focal depth of the lens apparatus being defined by D, its minimum drive quantity d is set as below:

$$0 < d < D.$$

Setting the minimum drive quantity d at a value exceeding the focal depth D is undesirable, since a blur is sometimes detected over a single step of feed of the pulse motor 8a. On the contrary, setting it in an excessively fine manner causes drawbacks such as a long time needed for achieving the focus state. Accordingly, the minimum drive quantity d is set as below:

$$0.2D \leq d \leq 0.5D.$$

The minimum drive quantity d must be changed in accordance with either insertion and non-insertion states of the power-varying member (the extender lens unit 6 and so forth) inserted in the space S in the relay lens unit 7, depending on where the rear focus lens unit 7b is disposed relative to the power-varying member.

For example, when the power-varying member is inserted in the space S lying closer to an object than the rear focus lens unit 7b as shown in FIG. 1 and when the variable ratio of the power-varying member is denoted as m, insertion of the power-varying member results in magnifying an F-number by m-fold, while the sensitivity of the back focus in accordance with the drive of the rear focus lens unit 7b remains unchanged. Accordingly, when the power-varying member is inserted, the minimum drive quantity dext of the rear focus lens unit 7b is given as below:

$$dext = d \times m,$$

where d represents a minimum drive quantity of the rear focus lens unit 7b in the non-insertion state of the power-varying member, and m represents the variable power ratio of the power-varying member and is at least 1.

Meanwhile, when the power-varying member is inserted into the space S lying closer to an image than alternative rear focus lens unit 7a indicated by an alternate long and short dash line in FIG. 1, insertion of the power-varying member results in magnifying an F-number by m-fold. In addition, the sensitivity of the back focus in accordance with the drive of the alternative rear focus lens unit 7a is changed to m². Hence, the minimum drive quantity dext of the alternative rear focus lens unit 7a in a state of the power-varying member being inserted is given as bellow:

dext=d/m, where d represents a minimum drive quantity of the rear focus lens unit 7a in the non-insertion state of the power-varying member, and m represents the variable power ratio of the power-varying member and is at least 1.

With the above-described results, the movable range L of the rear focus lens unit must be also set depending on whether the rear focus lens unit lies closer to an image or an object than the power-varying member.

For the present TV broadcasting, different screen sizes having, for example, aspect ratios of 16:9 and 4:3 are present; hence, in order to cope with the problem of different screen sizes, a so-called switchable camera changing the readable size of the pickup element of a camera is available in the market. Some of the switchable cameras have a transformation optical system (a power-varying member) transforming an image size in order to maintain the field of view on the side of a lens apparatus. In this case, the variable power ratio of the transformation optical system is about 0.8 and is generally smaller than 1. Due to limitation of the effective diameter of ray in the lens apparatus, there are some cases in which the aperture F-number of the lens apparatus cannot be changed to a brighter one, depending on the insertion or non-insertion state of the transformation optical system having a variable power ratio of m-fold (m<1). Fortunately, according to the present embodiment, even in such a case, the appropriate movable range and the minimum drive quantity of the rear focus lens unit are kept constant.

Figure 4:
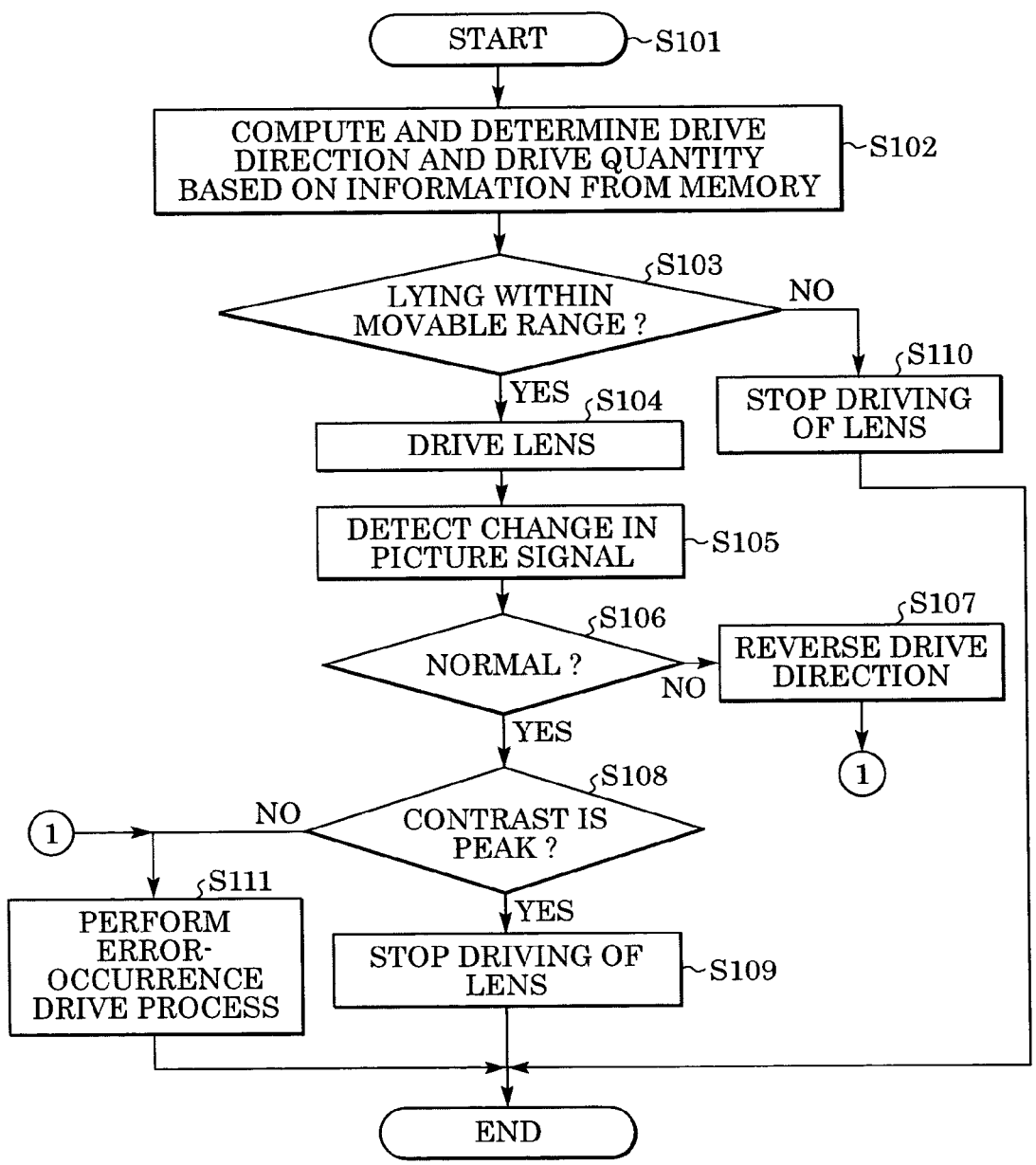
FIG. 4 is a flowchart of a focus compensation operation of the pickup system according to the first embodiment.

The flowchart illustrated in FIG. 4 and the movable range L of the rear focus lens unit 7b will be additionally described.

When the drive quantity of the rear focus lens unit 7b computed in response to an ON-signal from the focus compensation switch 14 in Step 102 does not lie within the movable range L, the CPU 15 stops driving the rear focus lens unit 7b in Step 110 and also displays a warning on the display unit 18 disposed on the external frame surface of the drive unit 13 and the viewfinder 19 of the camera.

In the error-occurrence drive process carried out in Step 111, the pulse motor 8a is driven for every single step; the maximum of the picture signal (the AF evaluation value) is searched while computing its rate of change; and the alternative rear focus lens unit 7a is stopped at the position at which the maximum is found. When the CPU 15 determines that the move quantity of the rear focus lens unit lies out of the limitation of the movable range L on the way of searching, it displays a warning and stops driving of the rear focus lens unit 7b. The warning is displayed on the display unit 18 and, at the same time, on the viewfinder 19 of the camera.

By limiting the movable range L of the rear focus lens unit 7b as described above, both functions of the manual focus and the focus compensation can be instantaneously switched from each other without making the lens apparatus 30 longer.

Although the focus compensation function within the movable range L limited as described above does not always achieve focus adjustment under all pickup conditions, a professional camera operator handling a TV lens basically relies on the manual focus which the operator can quickly operate at his or her will and rarely uses it from a very blurred state. In the middle of performing the manual focus of a high resolution HD lens, upon hesitating to determine focus adjustment through the small viewfinder 19 of the camera, the operator rather hopes to instantaneously get an assist for performing the focus adjustment with the focus compensation function. To this end, the movable range L of the rear focus lens unit 7b is set so as to support a range, for example, from about 2 to 3 times to about 10 times the focal depth. Meanwhile, an arbitrary movable range L may be set by a picture-pickup operator under these conditions.

Also, according to the present embodiment, the manual focus mode can be instantaneously changed to the focus compensation mode by operating the focus compensation switch 14 which is easy to operate with push buttons or the like, thereby resulting in achieving quick and accurate focus adjustment. In addition, since a warning is displayed when focusing is not possible, whether the picture-pickup operator can easily check whether focusing is really achieved with the focus compensation function.

The AF mode selection switch 20 will be described. The AF mode selection switch 20 serves so as to select a mode in the focus compensation function. When the focus compensation switch 14 is turned on when a mode 1 is selected, the focus compensation operation is performed only once. The mode 1 is mainly used when a fine focus adjustment is needed against a still subject.

When a mode 2 is selected, the focus compensation operation is repeated while turning on (pressing) the focus compensation switch 14. The mode 2 is mainly used when an object distance varies within an allowable focus range achieved by the focus compensation function.

When a mode 3 is selected, the focus compensation switch 14 serves as an alternate switch. That is, pressing the focus compensation switch 14 so as to be turned on causes the focus compensation function to work, and pressing it again so as to be turned off causes the focus compensation operation to stop.

With respect to a handheld TV lens, the picture-pickup operator often supports the drive unit (the lens apparatus) with his or her right hand. In this case, the switch or the operation ring is operated with his or her left hand. The mode 3 is convenient since a ring for performing a zooming operation or the aperture is operated in a state in which the focus compensation switch 14 is being pressed with his or her left hand so as to bring the focus compensation function to work. Also, in the mode 3, when the manual focus ring 2 is operated during the focus compensation operation, on the basis of positional results (for example, movement in a reverse direction or stop for performing the focus compensation operation) detected by the position detector 23, the CPU 15 determines that the manual focus is under operation; stops the focus compensation operation; and returns to the manual focus mode.

As described above, the focus compensation switch 14 has a specification of selecting one of the three modes depending on pickup situations. In any one of the modes, when the manual focus ring 2 is manually operated during the focus compensation operation, on the basis of the positional results detected by the potentiometer 23, the CPU 15 determines that the manual focus is under operation, stops the focus compensation operation, and returns to the manual focus mode.

Additionally, each of the foregoing modes may be replaced with one of the following modes (1) to (3) if needed, that is, (1) a mode performing the focus compensation operation in response to pressing the focus compensation switch 14 so that the picture-pickup operator intentionally selects the focus compensation mode, (2) a mode automatically moving to the focus compensation mode after completion of the manual focus by pressing the focus compensation switch 14 for a log period time, (3) a mode making the manual focus available by manually operating the manual focus ring 2 while pressing the focus compensation switch 14 and moving to the focus compensation mode in response to releasing the focus compensation switch 14. In this case, the TV lens may be constructed so as to change the contents of the modes corresponding to the intention of the picture-pickup operator by setting DIP switches or the like (not shown).

A process after completion of the foregoing focus compensation will be additionally described. After completion of the focus compensation, by manually operating the manual focus ring 2, the front focus lens unit 1 is driven so as to change the focus state. In the meantime, when the rear focus lens unit 7b lies away from its reference position after completion of the focus compensation, a problem that an intended subject is not brought into focus upon manually operating the front focus lens unit 1 toward the infinite side or the extremely close side or that the focus state cannot be maintained while a zooming operation occurs. In order to solve this problem, according to the present embodiment, as described above (see FIG. 5), when a zooming operation toward the wide angle side is detected by the position detector 21, the rear focus lens unit 7b is returned to the foregoing reference position, and when the zooming operation toward the telephoto side is detected by the same, the position of the rear focus lens unit 7b is maintained in an unchanged state.

In addition, according to the present embodiment, upon detecting a manual operation of the front focus lens unit 1 on the basis of a detected result of the position detector 23 after completion of the focus compensation operation, the rear focus lens unit 7b is returned to the foregoing reference position.

The pickup system shown in FIG. 1 has the recovery switch 24 provided therein so that the rear focus lens unit 7b is returned to the reference position by pressing the switch 24. With this arrangement, the manual focus operation can be properly performed as usual after completion of the focus compensation operation.

In the case where the focus position is detected and determined by an automatic focusing operation in a state in which the aperture is narrowed down to, for example, F/4 or F/5.6, and when the aperture is operated so as to be opened, since the focal depth is changed in a reducing direction, there is a large possibility of shifting the focus position. Hence, in order to avoid such a problem, a mode may be arranged so as to be selectable as a function of the focus compensation mode such that, triggered by the operation of the aperture, the focus compensation operation starts.

On the contrary, when the aperture is narrowed down so as to be closed, since the focal depth is changed in an increasing direction, the rear focus lens unit 7b may be arranged so as to return to the reference position in response to detection that the aperture is narrowed down exceeding the drive quantity L on the basis of a drive quantity L finely driven by the focus compensation operation and a change in aperture value. Further, in this case, the position of the rear focus lens unit 7b may be maintained in an unchanged state.

Second Embodiment

Figure 6:
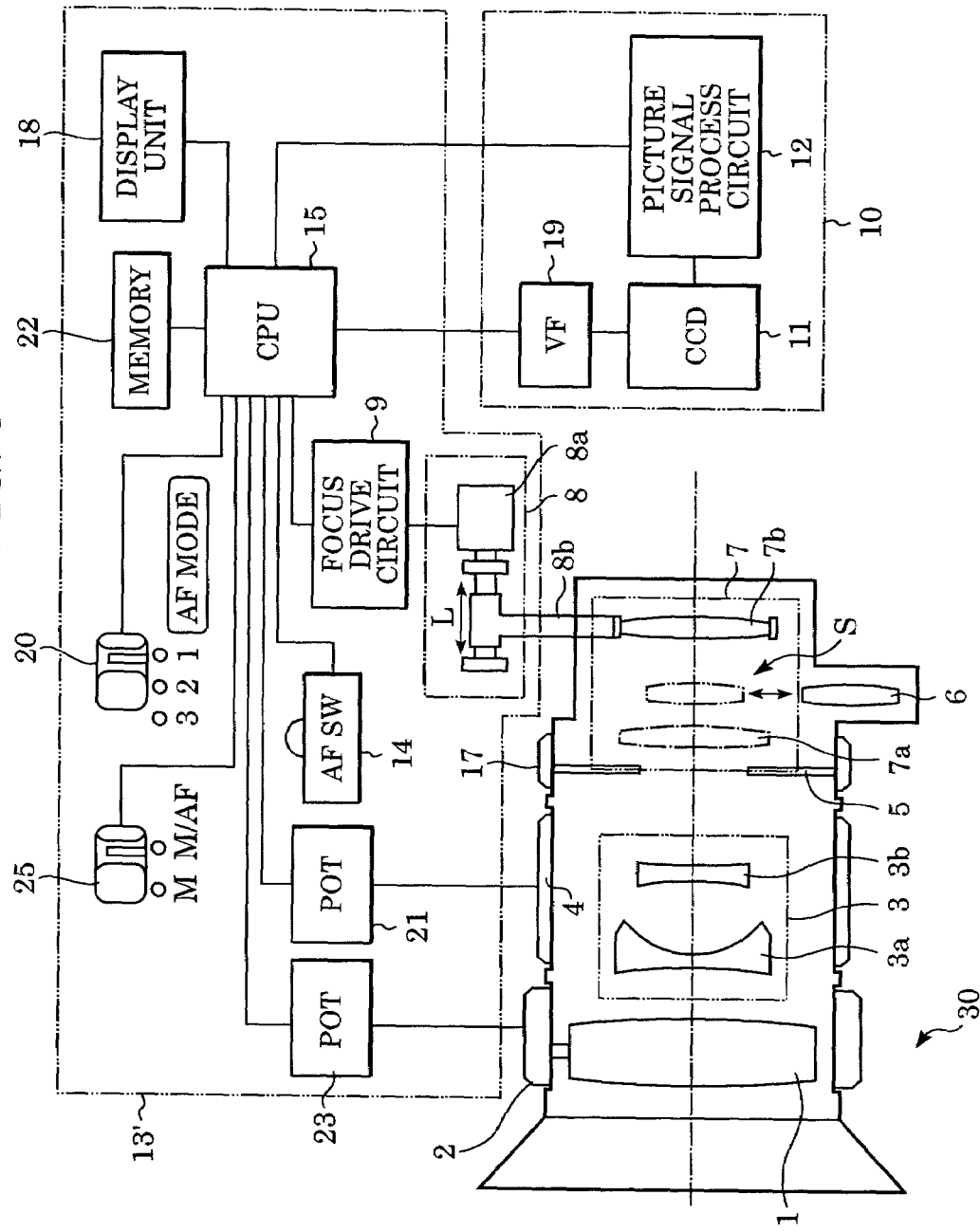
FIG. 6 is a block diagram of the structure of a pickup system according to a second embodiment of the present invention.

FIG. 6 shows the structure of a pickup system according to a second embodiment of the present invention. The pickup system includes the zoom lens apparatus 30, a drive unit (a drive controller) 13' incorporated in the lens apparatus 30, and the pickup apparatus 10 such as a TV camera or a video camera having the lens apparatus 30 incorporated thereto.

Common components to those in the first embodiment are identified by the same reference numbers appearing in FIG. 1 and the other figures, and their descriptions are omitted. In the present embodiment, the drive unit 13' has a mode selection switch 25, for selecting either a manual mode for performing only the manual focus or a combination mode combining the manual focus and the focus compensation function.

Although a focus operation of a TV lens is mostly performed manually, when the focus compensation switch 14 disposed in the drive unit 13' is wrongly operated during an operation of picking up a picture, an image out of focus is picked up in contrast to the intention of the picture-pickup operator. Hence, the mode selection switch 25 is provided in order to solve this problem. When a manual mode (M) is selected, the focus compensation operation is not performed even when the focus compensation switch 14 is pressed. When a combination mode (M/AF) is selected, the focus compensation operation is performed in response to pressing of the focus compensation switch 14.

Although the manual focus can be performed by manually operating the front focus lens unit 1 after completion of the focus compensation operation, the rear focus lens unit 7b is returned to the reference position when the mode selection switch 25 is returned from the combination mode to the manual mode. With this arrangement, the manual focus can be performed as usual, thereby eliminating the recovery switch 24 described in the first embodiment.

As described above, according to the present embodiment, a wrong operation of the focus compensation function caused by a wrong operation of the focus compensation switch 14 can be prevented.

Third Embodiment

Figure 7:
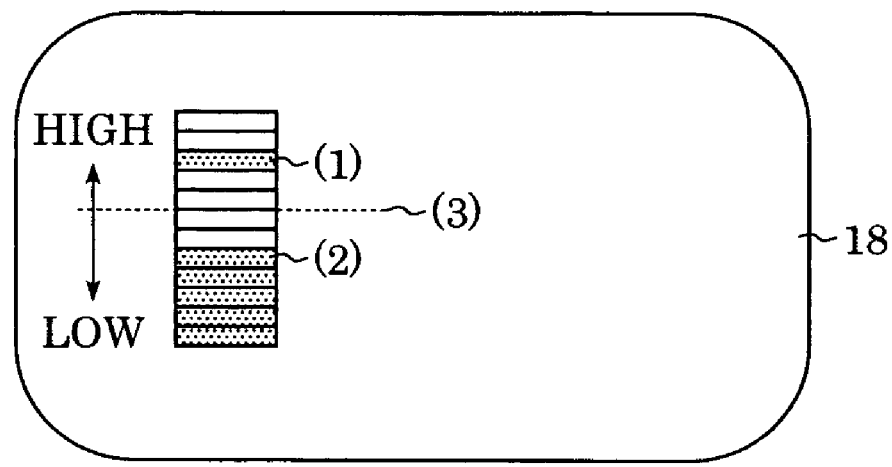
FIG. 7 is a schematic view of a display unit of a pickup system according to a third embodiment of the present invention, displaying its AF evaluation-value signal and focal depth.

In each of the drive units 13 and 13' described in the respective embodiments, a focus move quantity, a zoom position, and an aperture position are detected, and, in addition, on the basis of a change in the picture signal, a compensation quantity for performing the focus compensation, a drive direction and a drive quantity of the rear focus lens unit 7b are computed, whereby the above pieces of data can be sequentially displayed on the display unit 18 or the viewfinder (VF) 19. FIG. 7 illustrates an example of displaying data of an AF evaluation value or the focal depth on the display unit 18. Displayed on the display unit 18 shown in FIG. 7 are the level (1) of the highest AF evaluation value achieved during the focus operation, the level (2) of the present AF evaluation value (2), and a range (3) of the focal depth with reference to the level of the highest AF evaluation value.

A single step of a display scale corresponds to a minimum drive quantity of the rear focus lens unit 7b. Notations "HIGH and "LOW" in the figure indicate the height of the AF evaluation value.

Figure 8:
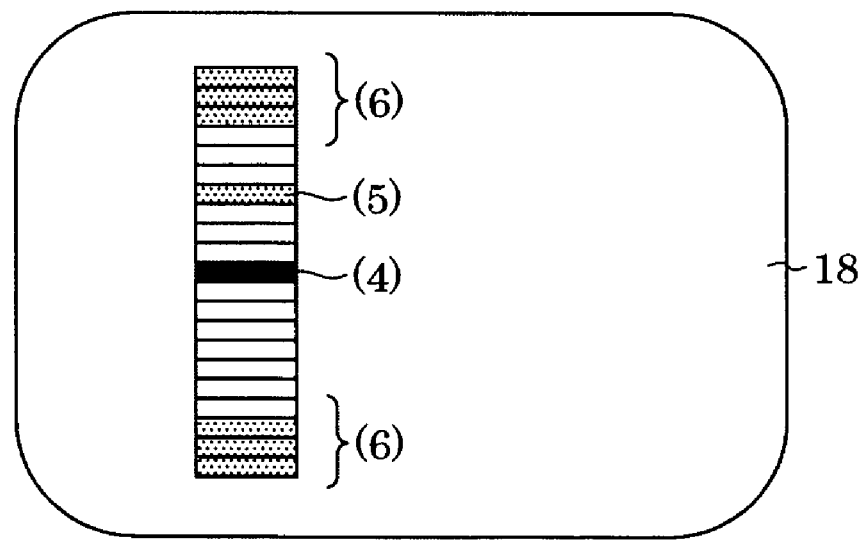
FIG. 8 is a schematic view of the display unit of the pickup system according to the third embodiment, displaying the position of a rear focus lens.

FIG. 8 illustrates an example of displaying the position of the rear focus lens unit 7b on the display unit 18. Displayed on the display unit 18 are the reference position (4) and the present position (5) of the rear focus lens unit 7b. In the figure, the present position (5) moves relative to the reference position. An object and an image lie on the upper and lower sides of the figure, respectively.

As described in the first embodiment, on the occasion when the rear focus lens unit 7b is driven so as to search the maximum of the AF evaluation value, when the position of the rear focus lens unit 7b lies out of the movable range L, in other words, falls in the range (6) shown in the figure, a warning is issued, for example, by changing the color of the range.

Although the lens apparatus of the lens system according to each embodiment has the drive unit placed thereto, the present invention is applicable to a so-called large diameter lens having functions of the drive unit built in the lens apparatus.

According to the present invention, not only because focus accuracy of the manual focus can be improved by performing a compensation operation of the manual focus, but also because a lens unit (the first lens unit) driven during the manual focus operation is different from that (the second lens unit) driven during the compensation operation, a conventional clutch mechanism or the like is eliminated, thereby avoiding a complicated structure of the lens apparatus. In addition, an operation member (for example, a manual focus ring) for manually operating the first lens unit may have a mechanical operation end provided thereto, thereby improving operability of the pickup lens system.

Also, the movable range of the rear focus lens unit (the second lens unit) can be made as small a range as needed for performing the compensation operation of the manual focus, whereby the movable range and a space for the power-varying member such as an extender or the like to be inserted therein are kept without making the size of the lens apparatus larger.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-167595 filed Jun. 4, 2004, which is hereby incorporated by reference herein.

What is claimed is:

1. A drive controller of a lens apparatus including a first lens unit movable to perform manual focus and a second lens unit disposed closer to an image than the first lens unit to perform auto focus, comprising:

a detection device detecting a focal state of the lens apparatus;

a storage device storing the focal state detected by the detection device; and a control device controlling the detection device detecting the focal state and the storage device storing a detection result of the detection device during manual focus by the first lens unit, performing auto focus by moving the second lens unit based on the detection result of the detection device stored in the storage device during the manual focus after completion of the manual focus, and shifting the focal state that is out of a focal position to the focal position by the manual focus, wherein a maximum drive quantity (L) of the second lens unit in accordance with the focus compensation operation, in a direction towards each of an object and an image, relative to a predetermined position of the second lens unit, a focal depth (D) of the lens apparatus, an F-number (Fno) of the lens apparatus, and a diameter ($\delta$) of a permissible circle of confusion satisfy the following conditions:

$$D = Fno \times \delta, \text{ and}$$

$0 < L < 10D,$ wherein the control device performs a compensation operation on the manual focus by the focus control of the control device after completion of the manual focus.

2. The drive controller according to claim 1, wherein the detection device detects the focal state based on a picture signal obtained via an operation of picking up a picture.

3. The drive controller according to claim 1, further comprising an operation member outputting a signal in response to an operation, wherein the control device performs the compensation operation in response to the signal from the operation member.

4. The drive controller according to claim 1, wherein a minimum drive quantity of the second lens unit in accordance with the compensation operation (d), and a focal depth of the lens apparatus (D) satisfy the following condition:

$$0 < d < D, \text{ and}$$

wherein the minimum drive quantity of the second lens unit is a minimum movement unit of the second lens unit over a single step.

5. The drive controller according to claim 1, wherein the lens apparatus is capable of inserting and extracting a power-varying member into and from a space defined closer to an object than the second lens unit so as to shift a focal position of the lens apparatus, wherein a minimum drive quantity of the second lens unit in accordance with the compensation operation in an insertion state of the power-varying member (dext), a minimum drive quantity of the second lens unit in accordance with the compensation operation in a non-insertion state of the power-varying member (d), and a variable power ratio of the power-varying member (in) satisfy the following conditions:

$$dext = d \times m, \text{ and}$$

$m \geq 1,$ and wherein the minimum drive quantity of the second lens unit is a minimum movement unit of the second lens unit over a single step.

6. The drive controller according to claim 1, wherein the lens apparatus is capable of inserting and extracting a power-varying member into and from a space defined closer to an image than the second lens unit so as to shift a focal position of the lens apparatus, wherein a minimum drive quantity of the second lens unit in accordance with the compensation operation in an insertion state of the power-varying member (dext), a minimum drive quantity of the second lens unit in accordance with the compensation operation in a non-insertion state of the power-varying member (d), and a variable power ratio of the power-varying member (m) satisfy the following conditions:

$$dext = d/m, \text{ and}$$

$m \geq 1,$ and wherein the minimum drive quantity of the second lens unit is a minimum movement unit of the second lens unit over a single step.

7. A lens system, comprising:
the drive controller according to claim 1;
a pickup optical system including the first and second lens units; and
a lens apparatus having the drive controller placed thereon.

8. A pickup system, comprising:
the lens system according to claim 7, and
a pickup apparatus having the lens apparatus placed thereon.

* * * * *